United States Patent [19]

Rawson

[11] 4,304,117
[45] Dec. 8, 1981

[54] BENDING TOOL

[76] Inventor: Richard A. Rawson, R.F.D. No. 1, Putnam, Conn. 06260

[21] Appl. No.: 76,902

[22] Filed: Sep. 19, 1979

[51] Int. Cl.³ .................. B21D 7/024; B21F 1/00
[52] U.S. Cl. .................... 72/388; 81/177 A; 72/457; 140/106
[58] Field of Search ............... 72/388, 387, 457, 458, 72/319, 369, 217, 218; 140/106, 102.5; 81/177 R, 177 A, 177 N

[56] References Cited

U.S. PATENT DOCUMENTS

| | | | |
|---|---|---|---|
| 124,362 | 3/1872 | Kernon | 72/388 |
| 1,319,798 | 10/1919 | Satterlee | 72/388 |
| 1,879,868 | 9/1932 | Breer | 72/369 |
| 2,428,237 | 9/1932 | McIntosh | 72/388 |
| 2,869,410 | 1/1959 | Prichard | 81/177 A |
| 3,709,264 | 1/1973 | Amman | 114/106 |
| 3,824,834 | 7/1974 | Durham | 72/387 |
| 4,070,932 | 1/1978 | Jeannotte | 81/177 A |
| 4,091,845 | 5/1978 | Johnson | 140/106 |
| 4,132,100 | 1/1979 | Schuler | 72/217 |

FOREIGN PATENT DOCUMENTS 1149225  5/1963  Fed. Rep. of Germany ........ 72/217

Primary Examiner—Gene P. Crosby
Attorney, Agent, or Firm—Keil & Witherspoon

[57] ABSTRACT

A tool for bending rod-like articles such as bendable insulated electrical wire, said tool having a shaft with a sleeve rotatably mounted thereon; a center post of a three post bending combination at one end of said sleeve; a first, radial bar fixedly mounted on and projecting from said shaft; a first, outer post mounted on the radially outer portion of said bar in substantially parallel, substantially opposing relationship with said center post; a second, radial arm projecting from said sleeve; a second, outer post mounted on the radially outer portion of said second arm in substantially parallel, substantially opposing relationship with said center post; a manually grippable, first handle fixedly attached to said sleeve and projecting laterally from the rearward end thereof; and a manually grippable, second handle, mutually offset relative to the first handle, fixedly attached to said shaft and projecting laterally from the rearward end thereof whereby application of manually applied torque to said handles causes said second outer post to orbit about said center post and to bend a rod-like article laid over said center post and under said outer posts.

6 Claims, 4 Drawing Figures

BENDING TOOL

BACKGROUND OF THE INVENTION

This invention pertains to hand tools used to bend rod-like articles such as insulation-sheathed electrical wire. Such wire is bent, with one or more relatively sharp bends, when it is laid in circuit-breaker boxes or enclosures, in junction boxes or enclosures, and in many other types of electrical apparatus and enclosures. An objective of the invention is to provide improvements in hand tools for bending electrical wire into bends of the desired angles, especially in electrical boxes or other enclosures where space is fairly restricted. The tools of the invention use, as pressure points for the bending operation, three posts which fit into relatively confined spaces and rearwardly offset, torque-applying handles which remain outside the post-occupied, confined spaces.

PRIOR ART

There are many types of tools used to bend rod-like or tube-like articles in varying degrees of bend ranging from shallow, obtuse angles to right angles to 180° bends. Some of these tools use, like the tools herein, three pressure points to effect the bend. The center of middle pressure point may be a post or rod of relatively small diameter or it may be a member with an arc of relatively large diameter, e.g., a quadrant or semi-circular mandrel, etc. The two outer pressure points may be posts or rods, longitudinally groove bars, small plates or sheets with an arcuate, e.g., semi-cylindrical, seat for the rod-like article, etc.

U.S. Pat. No. 3,824,834, for example, describes bending tools for electrical cables or wires and has two pivoted bending shoes moved manually by torque applied via socket wrenches to bend cable about a cylindrical collar. U.S. Pat. No. 4,132,100 discloses a bending tool having a pair of levers having a common pivot axis. One lever supports a grooved bending die while the other lever drives a pressure-applicator roller. The bending tool in U.S. Pat. No. 2,428,237 uses a grooved bending die supported by one handle. The bending die determines the radius of bend of tubing which is bent thereabout by pivoting a second handle.

BRIEF DESCRIPTION OF THE INVENTION

This invention involves hand tools for bending rod-like articles. The hand tools have a shaft with a sleeve rotatably mounted on the shaft. At least one end of said shaft projects from said sleeve. A center post or die of a three post bending combination is at one end of said sleeve. A first, radial arm is fixedly mounted on and projects from said shaft. A first, outer post is mounted on the radially outer portion of said arm in substantially parallel, substantially opposing relationship with said center post or die.

A second, radial arm projects from said sleeve. A second, outer post is mounted on the radially outer portion of said second arm in substantially parallel, substantially opposing relationship with said center post. A manually grippable, first handle is fixedly attached to said sleeve and projects laterally therefrom. A manually grippable, second handle is fixedly attached to said shaft and projects laterally therefrom. Application of manually applied torque to said handles causes the second outer post to orbit about said center post and to bend a rod-like article laid over said center post and under said outer posts.

Preferably, the three posts each have a circumferential groove in which the article to be bent is laid. The respective, manually grippable handles preferably are mutually offset rods projecting laterally from said sleeve and said shaft. The first radial arm may be a flat bar lying in a plane at right angles to the longitudinal axes of said posts and is fixedly mounted upon said shaft. The first outer post is fixedly mounted on the radially outer end of said bar. Also preferably, the first and second handles project laterally from the rearward end of said sleeve and from the rearward end of said shaft to provide a rearwardly offset arrangement of said handles relative to said posts whereby the posts may be positioned in an electrical enclosure with the handles outside said enclosure, e.g., a circuit-breaker enclosure.

PREFERRED EMBODIMENTS

Preferred embodiments of the invention are illustrated in the drawings, wherein.

Figure 1:
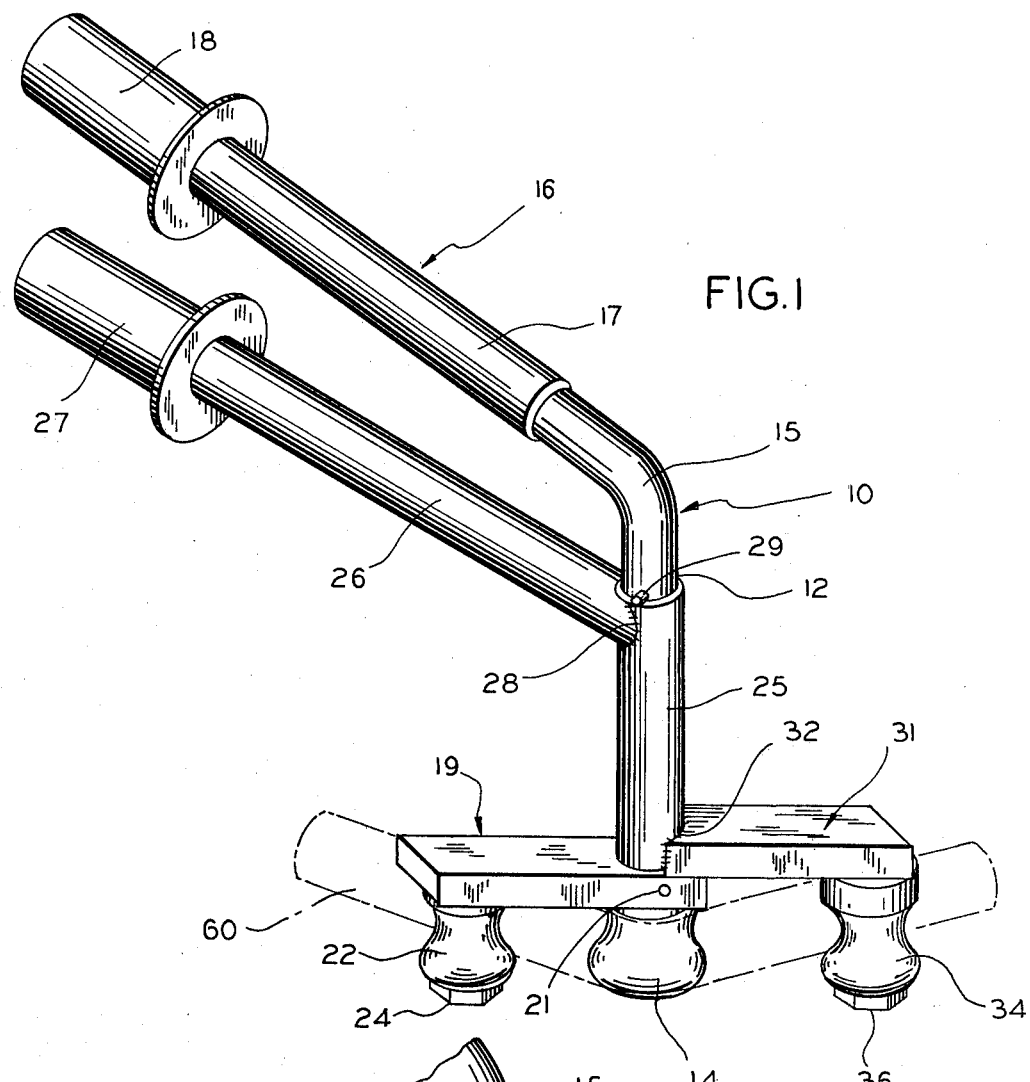
FIG. 1 is a perspective view of a first embodiment of a hand tool for bending insulated electrical wire.
Figure 2:
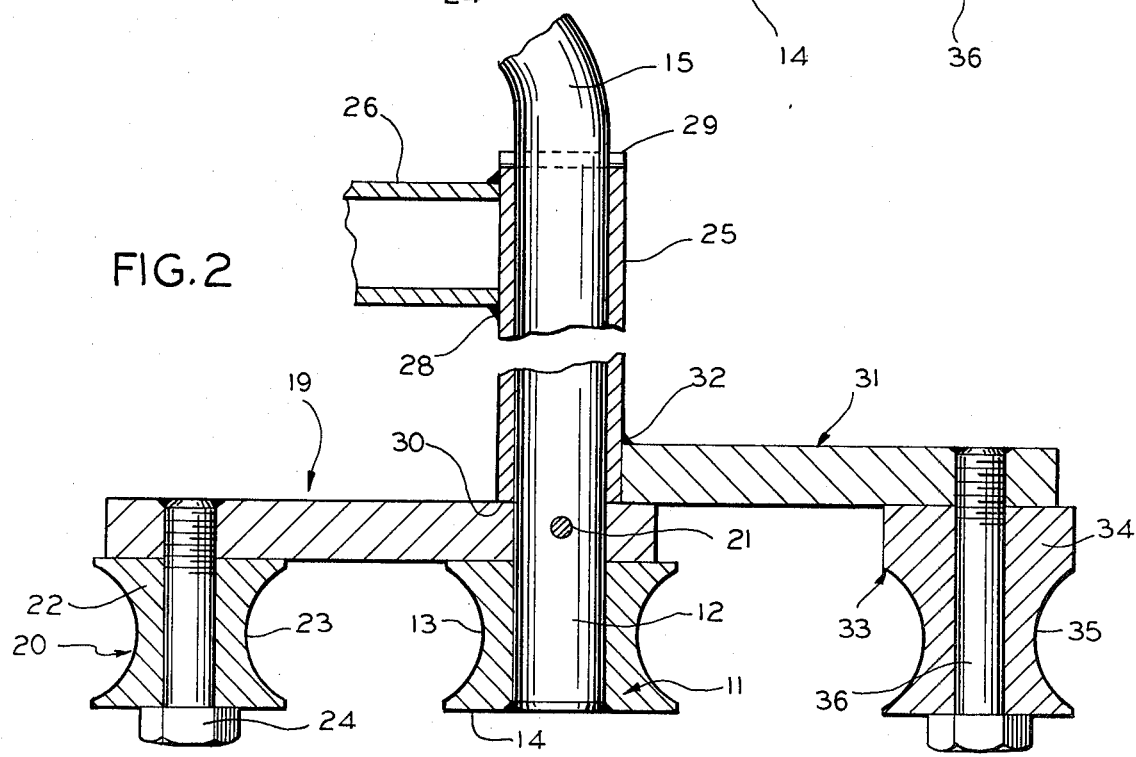
FIG. 2 is a fragmentary, section view of the embodiment of FIG. 1.

Referring to the drawings, the bending tool 10 of FIGS. 1 and 2 comprises a hollow center post 11 fixedly attached to one end of a pivot shaft 12. The post 11 has an annular groove 13 in which the article to be bent is laid. The post 11 in the illustrated embodiment is an annularly grooved sleeve 14 fixedly mounted on one end of the shaft 12.

The shaft 12 has an angular bend 15 of about 60°–70° and a laterally projecting handle 16, e.g., a tubular extension 17 mounted on the laterally extending part of the shaft 12, and a handle grip 18.

Just behind the sleeve 14, a flat bar, lateral arm 19 is fixedly attached to the shaft 12 by a pin or set screw 21. A first, outer post 20 is fixedly or rotatably mounted on the radially outer end of the arm 19. The post 20 is a sleeve 22 having an annular, transversely curvate groove 23 and mounted fixedly or rotatably on the arm 19 by the bolt 24.

A tubular sleeve 25 is rotatably mounted on the shaft 12. A tubular handle 26 with a hand grip 27 projects laterally from the rearward end of sleeve 25 and is fixedly secured thereto by a weld 28. A pin 29 extending through and projecting from the shaft 12 keeps the sleeve from slipping axially on the shaft 12, the opposite end 30 of the sleeve being in sliding engagement with the radial arm 19.

A flat bar, radial arm 31 is fixedly secured to the end 30 of the sleeve 12 by weld 32. A second, outer post 33 is mounted on the radially outer portion of the arm 31. The post 33 is made of the sleeve 34 with its annular groove 35, like groove 23, in opposing relationship to center post groove 13. A bolt 36 fixedly or rotatably mounts the sleeve 34 on the laterally-extending arm 31.

Figure 3:
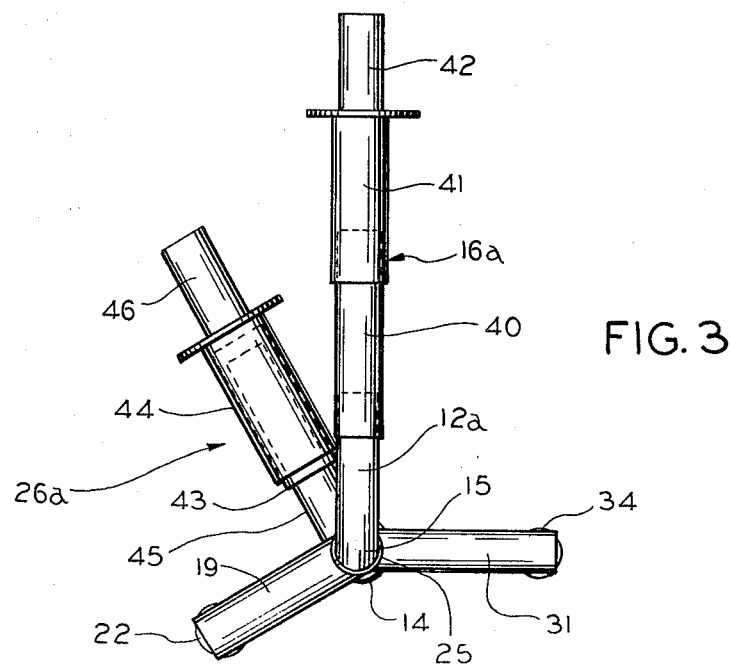
FIG. 3 is a side elevation of a second, bending tool embodiment in which the torque-applying handles telescope for compactness.

Referring to the embodiment of FIG. 3, it is like the embodiment of FIGS. 1 and 2 except for the handles. Hence, like numerals in FIG. 3 designate like parts. The handle 26a in FIG. 3 is composed of tubular, telescoped sections 43, 44 and 45 and hand grip 46. The section 43 telescopes over the tubular section 45 while the section 44 telescopes over section 43, giving a more compact handle when the tool is not in use. Similarly, the handle 16 is composed of tubular section 40 telescoped over the laterally extending part 12a of the shaft 12, a tubular section 41 telescoped over the section 40, and a hand grip 42.

Figure 4:
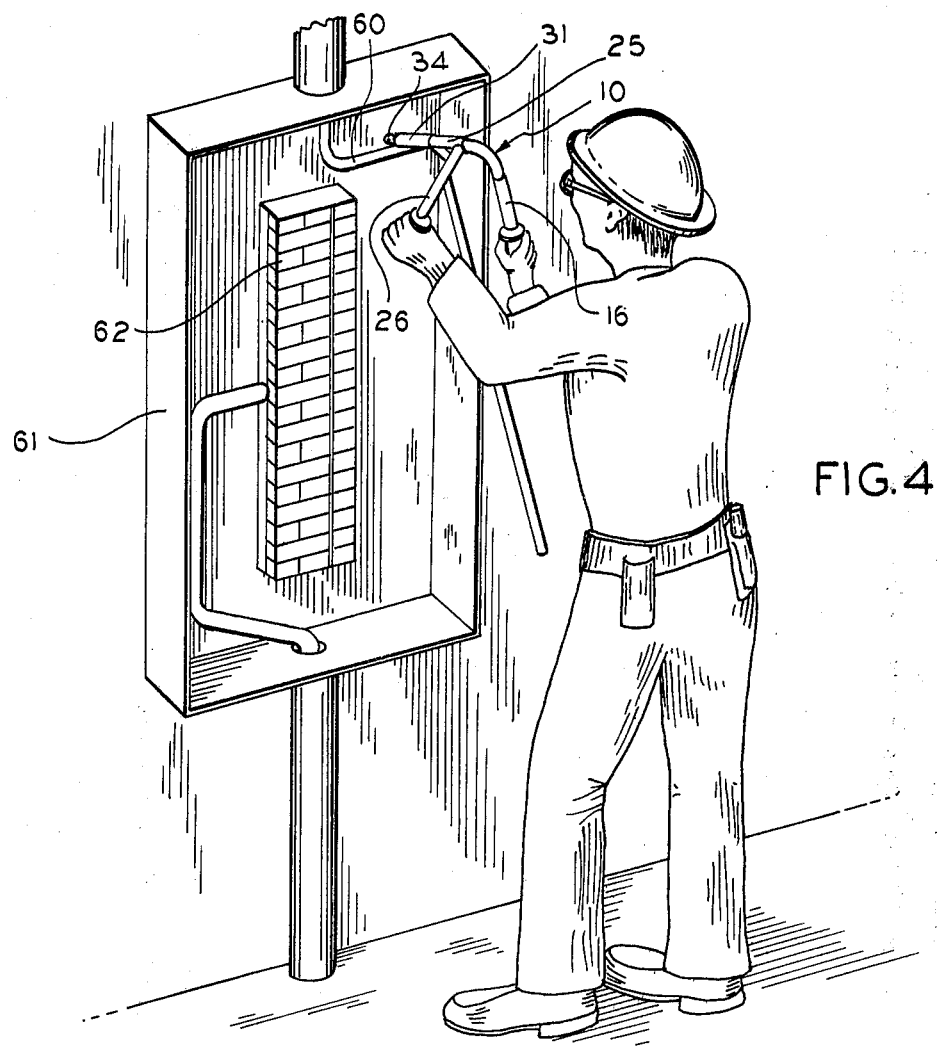
FIG. 4 is a perspective view of a workman using the bending tool to bend an insulated, electrical wire in a confined space within an electrical enclosure.

FIG. 4 shows how the tool is used in bending insulated electrical wire in a confined space. Here the workman is using the bending tool 10 to bend an insulation-sheathed, electrical wire or cable 60 in a closely confined space in the corner of an electrical apparatus enclosure, e.g., a circuit breaker box 61 having a bank 62 of circuit breakers. Note that the handles 16, 26 are outside the box and can be moved free of the confinements within the box in providing the desired bend in the wire.

It will be appreciated from the foregoing that the bending tools of the invention herein can take many forms other than the preferred forms shown in the drawings and that the invention as herein claimed is not limited to the illustrated embodiments.

The invention is hereby claimed as follows:

1. A tool for bending rod-like articles which comprises a shaft, a sleeve rotably mounted on the shaft with at least one end of said shaft projecting from said sleeve, a center post of a three post bending combination mounted on and centered at one end of said shaft, a first, radial arm fixedly mounted on and projecting from said shaft, a first, outer post mounted on the radially outer portion of said arm in substantially parallel, substantially opposing relationship with said center post, a second, radial arm projecting from said sleeve, a second, outer post mounted on the radially outer portion of said second arm, at a point essentially equidistant from said center post as said first outer post, in substantially parallel, substantially opposing relationship with said center post, a manually grippable, first handle fixedly attached to said sleeve and projecting laterally therefrom, and a manually grippable, a second handle fixedly attached to said shaft and projecting laterally therefrom, whereby application of manually applied torque to said handles causes said first and second outer posts to orbit about said center post and to bend a rod-like article laid across said center post and across said outer posts by the application of necessarily, essentially, equal opposing forces against the rod-like article.

2. A tool as claimed in claim 1, wherein said posts each have a circumferential groove in which the article to be bent is laid.

3. A tool as claimed in claim 1, wherein the respective, manually grippable handles are mutually offset rods proejcting laterally from said sleeve and said shaft.

4. A tool as claimed in claim 1, wherein said radial arms are flat bars lying in planes at right angles to the longitudinal axes of said posts and fixedly mounted upon said respective shaft and sleeve, and said outer posts being fixedly mounted on the radially outer ends of said bars.

5. A tool as claimed in claim 1, wherein the first and second handles project laterally from the rearward end of said sleeve and from the rearward end of said shaft to provide a rearwardly offset arrangement of said handles relative to said posts whereby the posts may be positioned in an electrical enclosure with the handles outside said enclosure.

6. A tool as claimed in claim 1, wherein the first and second handles each comprise an inner shaft and an outer shaft wherein the outer shaft is moveably fitted over the inner shaft such that is telescopes laterally outward for use and telescopes laterally inward for storage.

* * * * *